Feb. 4, 1969   H. WEHDE ET AL   3,425,751
HYDRAULIC BRAKE-OPERATION DEVICE FOR VEHICLES OF ALL TYPES
WITH SKIDDING PREVENTION MEANS
Filed May 11, 1966

Inventors:
Heinz Wehde
Heinz Leiber
by Janett G Montague
Attorney

United States Patent Office 3,425,751
Patented Feb. 4, 1969

3,425,751
HYDRAULIC BRAKE-OPERATION DEVICE FOR VEHICLES OF ALL TYPES WITH SKIDDING PREVENTION MEANS
Heinz Wehde, 215 Romerstrasse, 69 Heidelberg, Germany, and Heinz Leiber, 2 Im Enklert, 6906 Leimen, Germany
Filed May 11, 1966, Ser. No. 549,407
Claims priority, application Germany, May 14, 1965, G 43,599
U.S. Cl. 303—21      3 Claims
Int. Cl. B60t 13/18, 8/12

ABSTRACT OF THE DISCLOSURE

A hydraulic brake-operation device including a skidding protection device. In such devices the content of hydraulic brake fluid is limited by the measurements of the master brake cylinder and the pedal brake force of the driver. In case of a strong braking action by means of the pressure control unit comparatively a large quantity is used up. It can occur thus, in particular with emergency braking, that the piston of the master brake cylinder reaches nearly its end position, so that only a brake fluid reserve remains. At this point it must be assured that no brake fluid is fed any more to a storage chamber. This remainder of the brake fluid must remain in the conduit to the brake cylinders for the remaining braking action. The present invention provides that the skidding protection device is rendered noneffective, if a certain remaining volume is reached in the master cylinder and a certain position of the piston is obtained. In the following braking actions the driver has to rely on the sense of his foot force. In any case it is possible to stop the vehicle to a standstill with the remaining quantity of the brake fluid.

---

Figure 1:
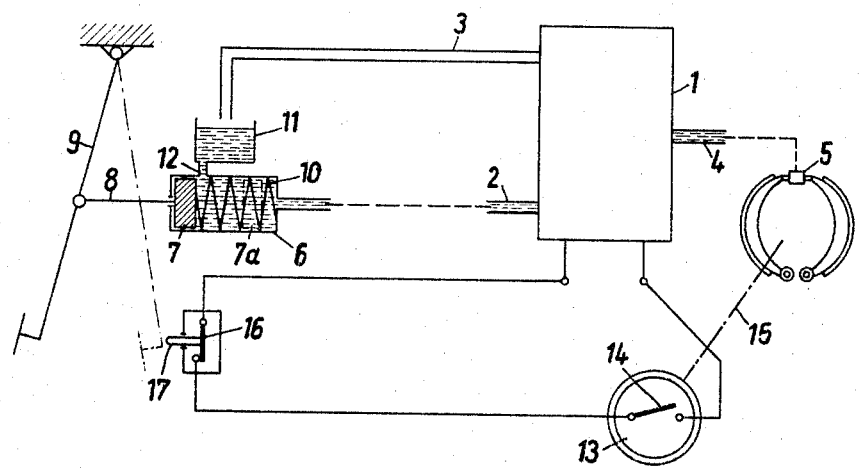

The present invention relates to a hydraulic brake-operation device for vehicles of all types including a skidding protection means.

In such skidding protection devices normally a feeding conduit is connected with the conduit leading to the wheel brake cylinder and a discharge conduit is closed, while during locking the connection between the feeding conduit and the wheel brake cylidner conduit, is separated and the wheel brake cylinder conduit is connected with the discharge conduit.

An appreciable characteristic of these skidding protecting devices resides in the fact, that the brake pressure is lowered during locking by an irreversible release of brake fluid.

Until now, as far as it is known, such skidding protection devices have been used only in connection with pump brakes. In these brake systems a pump is continuously in operation and maintains a pressure fluid circuit. From the circuit a larger or smaller part is branched off by means of a valve arrangement and is fed to the brakes. Accordingly, the release of brake fluid from the main brake conduits leading to the wheel brake cylinders has no disadvantageous consequences.

It is one object of the present invention to provide a hydraulic brake operation device for vehicles of all types having skidding protecting means, wherein the previously mentioned skidding protection devices are applied also in connection with simple hydraulic brakes, which work with a main brake cylinder operated directly by the driver or with pneumatic brake amplifiers.

It is another object of the present invention to provide a hydraulic brake-operation device for vehicles of all types having skidding protection means, wherein in a skidding protection device of the type mentioned above means are provided which prevent the effect of the skidding protection device, namely the removal of brake fluid from the wheel brake cylinder conduit, before one of the force transmitting members contributing to the production of the brake pressure is in engagement due to most extensive brake fluid removal.

If such means would not be provided, in case of improper operation or in case of unusually unfavorable road conditions, the piston producing the brake pressure would abut at the end after a greater number of control steps of the skidding protection device, since the cylinder content is exhausted, due to the continuous release of small quantities of oil. Likewise, the brake pedal can reach the end of the pedal path or one of the parts of the brake pressure amplifiers can come into engagement, if such amplifier is provided. In a predetermined brake device it can be easily ascertained, which one of the structural parts designated jointly as force transmitting members, is decisive one.

In such a case, the driver is suddenly surprised, that no brake effect is available any more, as long as he does not take the foot off the brake for short time periods and permits a return of the piston at least for a short stroke.

It is, therefore, another object of the present invention to provide a hydraulic brake-operation device for vehicles of all types with skidding protection means, wherein shortly prior to the dangerous release of the brake effect, the further discharge of brake fluid is prevented. The brake pressure remains as it is, exactly as no skidding protection device would be incorporated. It is to be emphasized, that this is an additional safety measure; normally the slight protecting device should control the brake pressure up to the stand-still of the vehicle, without necessity that the driver removes the foot from the brake pedal.

It is another object of the present invention to provide a hydraulic brake-operation device for vehicles of all types with a skidding protection means, wherein the latter are electrically operated and which comprise a contact arranged in an electric circuit of the skidding protection means, which contact is operable in dependency upon the position of the force transmission members, yet independently from the brake pressure. The contact must be designed such and be disposed at such a place within the electrical circuit, that starting with its operation, the feeding conduit is continuously connected with the wheel brake cylinder conduit independently upon the fact, whether the wheel is locked or not. It is possible to arrange, for instance, this safety contact in accordance with the present invention such, that it is operated by the brake pedal or also by the double piston of a brake pressure amplifier. Essential is only, that the contact shifts, as soon as a predetermined path or volume reserve limit is surpassed.

It is yet another object of the present invention to provide a hydraulic brake-operation device for vehicles of all types with skidding protection means, wherein a storage chamber having a movable wall is provided, which wall has the tendency to adjust itself by spring pressure into an end position providing the smallest possible chamber volume. This storage chamber is connected with the discharge conduit and thus receives the quantity of braking fluid which is ejected during each cycle of operation. A second conduit leads from the storage chamber or directly from the discharge conduit over a nonreturn valve to the feeding conduit. Yet the valve is arranged such that it opens from the storage chamber to the feeding conduit and closes in the opposite direction. The greatest possible volume of the storage chamber is to be measured somewhat smaller than the volume reserve available in the brake-operation device.

This typical volume reserve of a brake arrangement is to be determined generally in the following manner: One produces at first, by pressing down the brake pedal, the highest possible brake pressure and in particular during the most unfavorable state of the device, that means, with worne brake layers, a hot drum, etc. Now, so much fluid is released from the wheel brake cylinder conduit, by maintaining this pressure, until one of the force transmission members enters engagement of the complementary part. The discharged volume is measured. It is equal to the "proper volume reserve."

Due to the previous measuring of the storage chamber, the latter is filled before the brake pressure suddenly gives. As long as the storage chamber is filled, however, no possibility exists to lower the brake pressure by means of the skidding protection device, unless the piston creating the pressure reverses. If it reverses, the pressure in the feeding conduit is smaller than that in the storage chamber, so that the latter is emptied and thereby the skidding protection device is again ready for operation.

A further appreciable advantage of the storage chamber resides in the fact, that it can be spacewise dealt together in compact manner with the skiding protection device and thereby a return conduit, which connects the discharge conduit with the mostly further remote collecting vessel, becomes superfluous. Likewise electrical connections from the contact, required in accordance with the first embodiment, to the skidding protection device can be eliminated. By this arrangement, the assembly and particularly the later equipment of vehicles with skidding protection devices is simplified.

Figure 2:
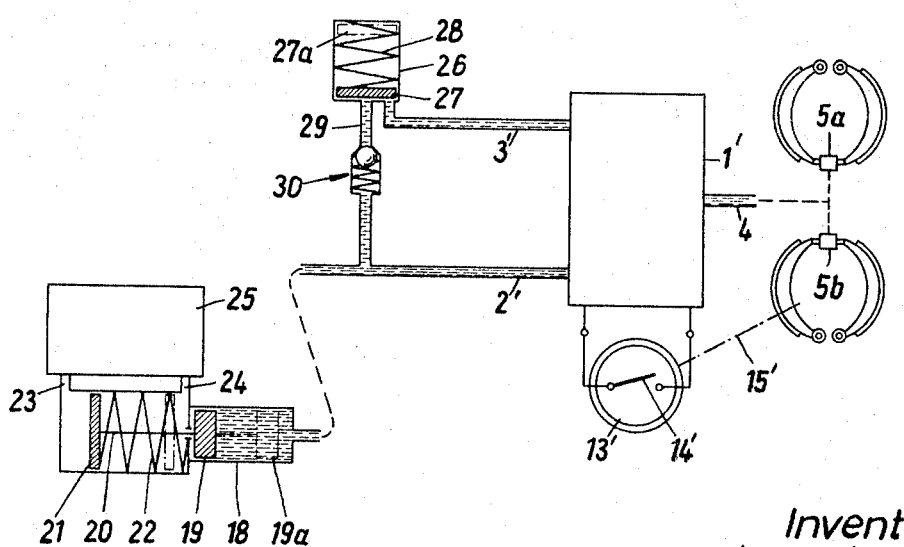

With these and other objects in view which will become apparent in the following detailed description, the present invention will be clearly understood in connection with the accompanying drawing, in which:

FIGURE 1 is a schematic elevation of a braking device with a main brake piston operable by the driver and with a safety contact; and FIG. 2 is a schematic elevation of a braking device including pneumatic brake amplifiers and also a storage chamber.

Referring now to the drawing, and in particular to FIG. 1, a skidding protection device 1 is disclosed. The skidding protection device 1 comprises a feeding conduit 2, a discharge conduit 3 and a third conduit 4 leading to a wheel brake cylinder 5 or to a plurality of such wheel brake cylinders 5, respectively. A main brake cylinder 6 is connected with the feeding conduit 2. A main brake piston 7 reciprocates in the main brake cylinder 6, which main brake pitson 7 is secured to the end of an operating rod 8. The latter is pivoted to a brake pedal 9. A pressure spring 10 maintains the piston 7 normally in its original position, shown in FIG. 1 in full lines. A thin connection conduit 12 terminates slightly in front of the piston 7, leading from a pressure-less brake fluid collecting container 11. The discharge conduit 3 leads to this collecting container 11. A rotary retarding sensor of any suitable structure, which contains a normally open contact 14, is disposed by a drive connection 15, shown in dotted lines, or is connected directly with the braking wheel or the wheels. A safety contact 16 is disposed in series with the contact 14 of the sensor, which contact 16 is normally closed. If this contact 16 is opened, the sensor and the skiding protection device cannot exercise anymore the function assigned thereto.

If the brake pedal is operated, the brake pressure is built up through the conduits 2 and 4 in the wheel brake cylinder 5 and the brakes start operation. If a wheel is locked or is close to it, the sensor contact closes, the connection between the conduits 2 to 4 is interrupted and the connection from the conduit 4 to the conduit 3 is opened by any conventional means. The release of a smaller or larger quantity of fluid into the collecting vessel 11 causes a lowering of the brake pressure. The brake force is released, the wheel obtains again road contact, the sensor contact 14 opens again and the original connection between the conduit connections of the skidding protection device are resumed, so that the brake pressure increases again.

As it is known, this play repeats itself depending upon the road conditions more or less often, until the vehicle comes to a standstill. If, however, for instance, a heavy vehicle runs on a smooth road over a longer downwardly inclined path and the driver operates the brake pedal strongly continuously in improper manner, the brake pedal 9 comes eventually into the position, in which it engages an operating pin 17 of the safety contact 16 and opens the contact. From here on, the conduit 2 and the conduit 4 remain in continuous connection. This position of the brake pedal 9 is shown in dotted lines as well as the corresponding position 7a of the main brake piston. The brake piston 7 is here near the end of the main brake cylinder 6 and only a small volume reserve remains, whereby it is understood that in the schematic showing the required volume is not completely shown.

By additional electric circuits and warning devices (not shown), the driver can be brought to attention of this position.

Referring now again to the drawing, and in particular to FIG. 2, the skidding protection device 1' with its conduits 2' and 4' is clearly disclosed, yet in this embodiment two wheel brake cylinders 5a and 5b are provided. A sensor 13' is likewise electrically connected with the skidding protection device. The feeding conduit 2' is connected with a secondary brake cylinder 18 of a pneumatic brake pressure amplifier.

The secondary brake piston 19 reciprocating in the cylinder 18 is secured to a pressurized air or suction air piston 21 by means of a connecting rod 20. A spring 22 retains the thus formed double pistons 19 and 21 in the original position, shown in the drawing in full lines. From the chambers disposed on both sides of the air piston 21, conduits 23 and 24 feed to a control member 25 of the brake pressure amplifier which is shown schematically only. The brake operating member, pedal or the like, effective upon this control member 25 is not particularly shown. A storage chamber 26 is also provided in accordance with the present invention. A piston 27 reciprocates in the storage chamber 26, which piston 27 has the tendency to assume the lowermost position, shown in full lines in the drawing, due to the fact that a very weakly measured storage chamber spring 28 is provided. The discharge conduit 3' terminates at the bottom of the storage chamber 26. Furthermore, a connecting conduit 29 leads from the lower end of the storage chamber 26 over a nonreturn valve 30 to the feeding conduit 2'. The nonreturn valve 30 is a simple ball valve, which permits passage from the storage chamber 26 to the feeding conduit 2'.

Under normal conditions the folowing operation takes place:

The fluid quantities occurring in form of jolts in the discharge conduit 3', reach the space of the storage chamber 26, which is disposed below the piston 27 and lifts the piston 27 stepwise slowly in upward direction. The nonreturn valve 30 remains closed, since the pressure in the feeding conduit 2' is appreciably higher, than in the discharge conduit 3', as long as the braking effect takes place. If the piston 19 is about in the position 19a, shown in dotted lines, the storage chamber 26 is substantially full, that means, the piston 27 engages the upper abutment, as shown by the position 27a in dotted lines. The secondary piston 21 is, however, again in the critical position 19a, shown in dotted lines, shortly prior to the end of its stroke. From now on, of course, a further automatic pressure reduction is no more possible, until the driver releases the brake operating member and thereby also discharges the double pistons 19 and 21. In this manner, in the second embodiment means are also provided according to which the driver is not surprised suddenly by inoperativeness of the brake.

Selectively the storage chamber 26 can also be formed as a bellows. Furthermore, the third embodiment can be produced of the brake operating device 6 to 12, shown in FIG. 1, at the feeding conduit 2' of the skidding protection device according to FIG. 2. Finally also pneumatic brake pressure amplifiers are known, in which the position of the double piston is indicated to the outside in one lever position, so that here also a safety contact similar to the shown in FIG. 1 can be provided.

While we have disclosed several embodiments of the present invention, it is to be understood that these embodiments are given by example only and not in a limiting sense, the scope of the present invention being determined by the objects and the claims.

We claim:
1. In a hydraulic brake control device for vehicle wheels in combination,
   a master brake cylinder device comprising, a master piston,
   a force transmitting member acting on said master piston for effecting a controlled pressure in said master cylinder,
   a feeding conduit connected with the outlet of said master brake cylinder device,
   a wheel brake cylinder,
   a brake conduit leading to said wheel brake cylinder and normally connected with said feeding conduit,
   a discharge conduit normally closed,
   skidding protection means automatically operatively connected with and closing said feeding conduit and connecting said brake conduit with said discharge conduit in response to the position of said force transmitting member,
   means preventing the discharge of brake fluid through said discharge conduit and thereby preventing the effect of said skidding protection means, when said force transmitting member reaches a predetermined intermediate position prior to abutment said master piston in said master cylinder.
2. The device as set forth in claim 1, including
   means for electrically operating said skidding protection means including an electric circuit,
   said electric circuit including a contact operable in response to the position of said force transmitting members.
3. The device as set forth in claim 1, which includes
   a nonpressure exerting brake fluid container which comprises a storage chamber having a spring-biased displaceable wall,
   said wall having the tendency to assume an end position to provide the smallest possible volume in said storage chamber, and
   said discharge conduit being connected with said storage chamber,
   a connecting conduit connecting said storage chamber with said feeding conduit,
   a check valve being disposed within said connecting conduit and opening towards said feeding conduit, and
   the greatest possible volume of said storage chamber being smaller than the volume reserve contained in said master brake cylinder device.

References Cited

UNITED STATES PATENTS

| | | | |
|---|---|---|---|
| 2,426,575 | 8/1947 | Eksergian | 303—21 X |
| 2,718,939 | 9/1955 | Bent et al. | 303—21 X |
| 2,759,570 | 8/1956 | Shirey | 188—181 |
| 2,804,353 | 8/1957 | Bush | 188—181 X |

DUANE A. REGER, *Primary Examiner.*

U.S. Cl. X.R.

188—181